US008290834B2

(12) United States Patent
Mundy

(10) Patent No.: US 8,290,834 B2
(45) Date of Patent: Oct. 16, 2012

(54) AD-HOC UPDATES TO SOURCE TRANSACTIONS

(75) Inventor: Kiran Mundy, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 1067 days.

(21) Appl. No.: 12/150,167

(22) Filed: Apr. 25, 2008

(65) Prior Publication Data

US 2009/0271300 A1    Oct. 29, 2009

(51) Int. Cl.
*G07B 17/00* (2006.01)
*G07F 19/00* (2006.01)
(52) U.S. Cl. ......................................... 705/30
(58) Field of Classification Search ...................... 705/30
See application file for complete search history.

(56) References Cited

U.S. PATENT DOCUMENTS

| | | | | |
|---|---|---|---|---|
| 6,151,608 | A * | 11/2000 | Abrams | 707/679 |
| 2002/0161707 | A1 * | 10/2002 | Cole et al. | 705/42 |
| 2003/0172013 | A1 * | 9/2003 | Block et al. | 705/33 |
| 2003/0187780 | A1 * | 10/2003 | Arthus et al. | 705/39 |
| 2004/0162772 | A1 * | 8/2004 | Lewis | 705/34 |
| 2005/0044015 | A1 * | 2/2005 | Bracken et al. | 705/30 |
| 2005/0102226 | A1 * | 5/2005 | Oppenheimer et al. | 705/38 |
| 2005/0246274 | A1 * | 11/2005 | Abbott et al. | 705/40 |
| 2006/0036448 | A1 * | 2/2006 | Haynie et al. | 705/1 |
| 2006/0089909 | A1 * | 4/2006 | McLeod et al. | 705/44 |
| 2006/0218060 | A1 * | 9/2006 | Lawlor | 705/32 |
| 2006/0253333 | A1 * | 11/2006 | Magarian et al. | 705/24 |
| 2008/0004998 | A1 * | 1/2008 | Conrad et al. | 705/30 |
| 2008/0120129 | A1 * | 5/2008 | Seubert et al. | 705/1 |
| 2008/0183605 | A1 * | 7/2008 | Taraboulsi | 705/30 |
| 2009/0271300 | A1 * | 10/2009 | Mundy | 705/30 |

OTHER PUBLICATIONS

"Digital Fuel Eliminates Industry Barriers to SLA Management Adoption; Digital Fuel's ServiceFlow 5.0 Release Sets New Standards for Speed, Flexibility, Lowest Cost of Ownership, and Scalability in SLA Management." Business Wire Feb. 28, 2006 Business Dateline, ProQuest. Web. May 2, 2012.*

* cited by examiner

*Primary Examiner* — Matthew S. Gart
*Assistant Examiner* — Seye Iwarere
(74) *Attorney, Agent, or Firm* — Kraguljac Law Group, LLC

(57) ABSTRACT

Systems, methods, and other embodiments associated with handling a change to a transaction at an application level are described. One exemplary method includes receiving, in a sub-ledger accounting (SLA) logic, from a sub-ledger logic, data that characterizes a transaction(s) receivable from a sub-ledger. The data includes a field of interest identifier and a downstream column impact identifier that identifies a column that is affected by a change to the field of interest. The method includes storing the data and processing transactions from the sub-ledger in light of the stored data. The method includes selectively storing a difference between a value associated with a previously processed version of a transaction and a value provided in a changed transaction. The value may be stored in a new transaction to reconcile the difference between the stored value and the changed transaction value.

19 Claims, 9 Drawing Sheets

AD-HOC UPDATES TO SOURCE TRANSACTIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Accounting systems may process transactions. Transactions may be associated with applications including, for example, purchase order applications, sales order applications, accounts receivables, accounts payable, and so on. Each application may have its own transaction type. The transaction type may include a number of fields. Some fields may be identifier fields (e.g., project number, purchase order number, client identifier, period) while other fields may be amount fields (e.g., sales price, sales quantity, discount percentage). An application writes to a central general ledger through an application (e.g., sub-ledger accounting (SLA) application). An SLA logic determines to which account a transaction is to be posted based, at least in part, on the fields in the transaction. The transaction is then posted to the central general ledger with the account, amount, and period. Applications may have their own summarization ledger. In a summarization ledger, fields of interest are stored along with the summed up amount fields. New transactions from the application are posted to the summarization ledger where they update amounts in fields of interest associated with the transactions. The general ledger may in turn be used to produce documents including a balance sheet, an income statement, and so on. Thus, transaction information provided from an application, which may also be referred to as a sub-ledger, is collected and processed by an SLA, and then deposited into various destinations including, for example, a general ledger, a balance sheet, and so on.

The SLA may be a rules-based accounting logic that provides consistent accounting treatment to transactions created across different applications. The SLA may provide a common data model and repository for subsystem accounting activity. Conventionally, when a transaction was processed from a sub-ledger through the SLA into a ledger, that transaction was restricted from being changed due, for example, to issues with downstream reconciliation. Thus, once transactional data was interfaced outside a subledger, the source transaction could not be easily changed, if it could be changed at all. However, transactions may have included errors, omissions, and so on. Conventionally, a follow-on application level transaction may have been produced to correct the error or omission. For example, a first transaction may have reported a purchase order for ten units at $100 apiece. However, the actual purchase order quantity may have been for twenty units at $125 apiece. Conventionally, to remedy the mistake, a second application level transaction for the ten additional units may have been generated. Then, another transaction for all twenty units reconciling the additional $25 apiece may have been generated. In another conventional example, a replacement transaction for the correct quantity and the correct amount may have been provided after the original transaction was "backed out" or deleted from the system. Backing out or deleting a transaction may have been difficult because a single transaction may have included several fields that impacted several other fields (e.g., spreadsheet columns, ledger columns) in several other locations. For example, an SLA may have automatically created multiple simultaneous accounting records for a single transaction in different ledgers.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 9:
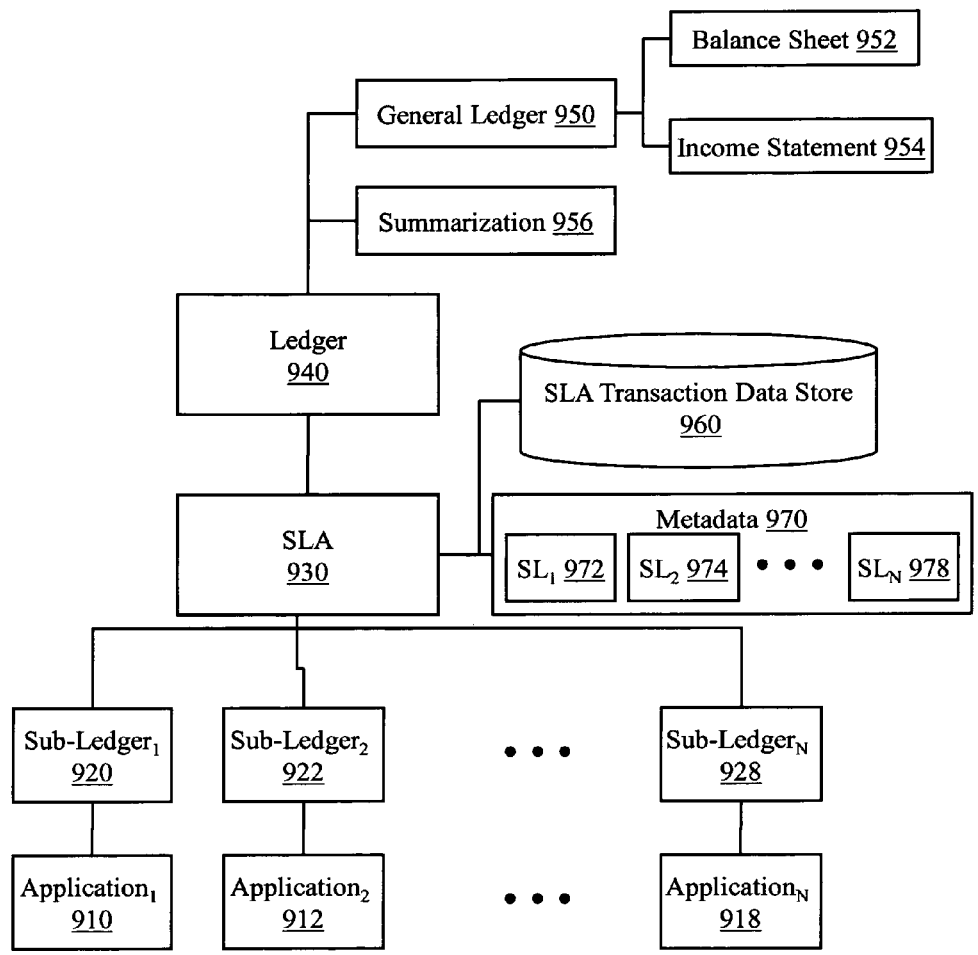
FIG. 9 illustrates a set of ledgers, applications, reports, and logics with which example systems and methods may operate.

FIG. 9 illustrates a set of ledgers, applications, reports, and logics with which example systems and methods may operate. The set of ledgers include a general ledger 950 and a set of sub-ledgers (e.g., sub-ledger$_1$ 920, and sub-ledger$_2$ 922 through sub-ledger$_N$ 928). The sub-ledgers may be associated with applications that process transactions. The sub-ledgers may track transaction level detail of financial activity. The set of applications may include application$_1$ 910, and application$_2$ 912 through application$_N$ 918. The set of applications may include, for example, an accounts receivable application, an accounts payable application, a purchase orders application, a sales order application, and so on. Each application may have transaction type(s) that are processed and posted to the general ledger through SLA, to a summarization ledger, to a downstream application, and so on.

An SLA 930 may be tasked with centralizing information from sub-ledgers to produce a ledger 940. Conventionally, an SLA may only post to a general ledger and applications may post data to summarization tables, downstream applications, and so on. SLA 930 may centralize these actions. The ledger 940 may be used to produce a general ledger 950, a summarization table 956, and so on. The general ledger 950 may in turn be used to produce financial statements including, for example, a balance sheet 952, an income statement 954, and so on.

The SLA 930 may store transaction data received from the sub-ledgers in an SLA transaction data store 960. Since different sub-ledgers may have different transaction types, SLA 930 may also store metadata 970 on a per sub-ledger and/or on a per transaction type basis. For example, metadata 970 may include sub-ledger$_1$ data 972, and sub-ledger$_2$ data 974 through sub-ledger$_N$ data 978. The sub-ledger data may store, for example, field of interest identifiers, related downstream data item identifiers, and so on.

Example systems and methods facilitate handling a change to a transaction at the application level, even after the transaction has been processed (e.g., posted) by a subsequent logic (e.g., SLA, ledger). An application level transaction may include a set of fields and a unique transaction identifier. Some fields may be identifier fields (e.g., customer number) while other fields may be amount fields (e.g., sales quantity, purchase price). Some fields may have an impact on downstream values (e.g., general ledger columns) while some fields may not. To facilitate handling a change to a transaction at the application level, even after the transaction has been processed through the SLA to the ledger, fields having an impact on downstream values may be identified at the application level. Information concerning these fields may then be registered with the SLA to facilitate handling changes. The information registered may include an identification of whether a field is an identifier field or an amount field and may also include an identification of downstream values that depend on an application level transaction field.

When the SLA processes a transaction, it may record details about the transaction in an SLA data store (e.g., central SLA table). The details may be indexed, for example, on the unique transaction identifier. The details may include the raw data available in the transaction (e.g., purchase order number, sales quantity, purchase price). The details may also include derived information (e.g., total sales quantity to date). The derived information may have been provided from information available in a sub-ledger and/or from another location(s). When a transaction is subsequently changed, example systems and methods facilitate handling the change so that data and details in the SLA data store, and elsewhere, reconcile the change with the original values. Rather than backing out a transaction, an SLA may add a new transaction at the SLA level. The new transaction may include data to reconcile the new information provided in the changed transaction with existing information provided in the original or earlier transaction. For example, if a change to a transaction indicates an increased purchase quantity, then an additional transaction (e.g., row) may be added, where the additional transaction reflects the difference between the original amount and the incorrect amount.

The SLA may determine that a transaction is one for which reconciling rows are to be produced by examining the unique transaction identifier. If the transaction identifier has not been previously encountered by the SLA, then the transaction is not a transaction for which reconciliation rows need to be produced. However, if the transaction identifier has been encountered by the SLA before, then the transaction may be a transaction for which reconciliation rows are needed. When the SLA determines that a transaction associated with the transaction identifier has been previously processed, the SLA can examine data registered by an application associated with providing the transaction to determine whether there is a change in any field for which there is a downstream impact. If there is a field for which there is a related downstream impact, then the SLA may need to synchronize the SLA data with the downstream location.

The SLA may be placed on the lookout for duplicate transaction identifiers by an application. For example, when an application determines that a transaction has been changed, the application may mark the transaction for reprocessing and may alert the SLA. In one example, the SLA may simply always be on the lookout for duplicate transactions. When an application determines that a transaction has been changed, the application may cause logics that process the transaction into a sub-ledger to reprocess the transaction. In this way, new values may be computed and made available to the SLA. The SLA may then be able to compare new values with old values and to produce additional transactions in the SLA to reconcile the values. The additional transactions may be stored, for example, as additional rows in an SLA table.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC refers to "application specific integrated circuit".
CD refers to compact disk.
CDDI refers to copper distributed data interface.
CD-R refers to CD recordable.
CD-RW refers to CD rewriteable.
DSL refers to digital subscriber line.
DVD refers to digital versatile disk and/or digital video disk.
FDDI refers to fiber distributed data interface.
HTTP refers to hypertext transfer protocol.
ISA refers to industrial standard architecture.
EISA refers to extended ISA.
ISDN refers to integrated services digital network.
LAN refers to local area network.
MSA refers to microchannel architecture.
PCI refers to peripheral component interconnect.
PCIE refers to PCI express.
RAM refers to random access memory.
DRAM refers to dynamic RAM.
DRRAM refers to direct RAM bus RAM.
SCSI refers to small computer systems interconnect.
SRAM refers to synchronous RAM.
ROM refers to read only memory.
PROM refers to programmable ROM.
EPROM refers to erasable PROM.
EEPROM refers to electrically erasable PROM.
SQL refers to structured query language.
URI refers to uniform resource identifier.
URL refers to uniform resource locator.
USB refers to universal serial bus.
WAN refers to wide area network.
XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

XPath is a non-XML language used to identify particular parts of XML documents. XPath indicates nodes by position, relative position, type, content, and so on. XPath expressions may represent numbers, strings, Booleans, and so on. XPath is a language for picking nodes and sets of nodes out of the tree structure that is an XML document.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. "Software" does not refer to stored instructions being claimed as stored instructions per se. The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
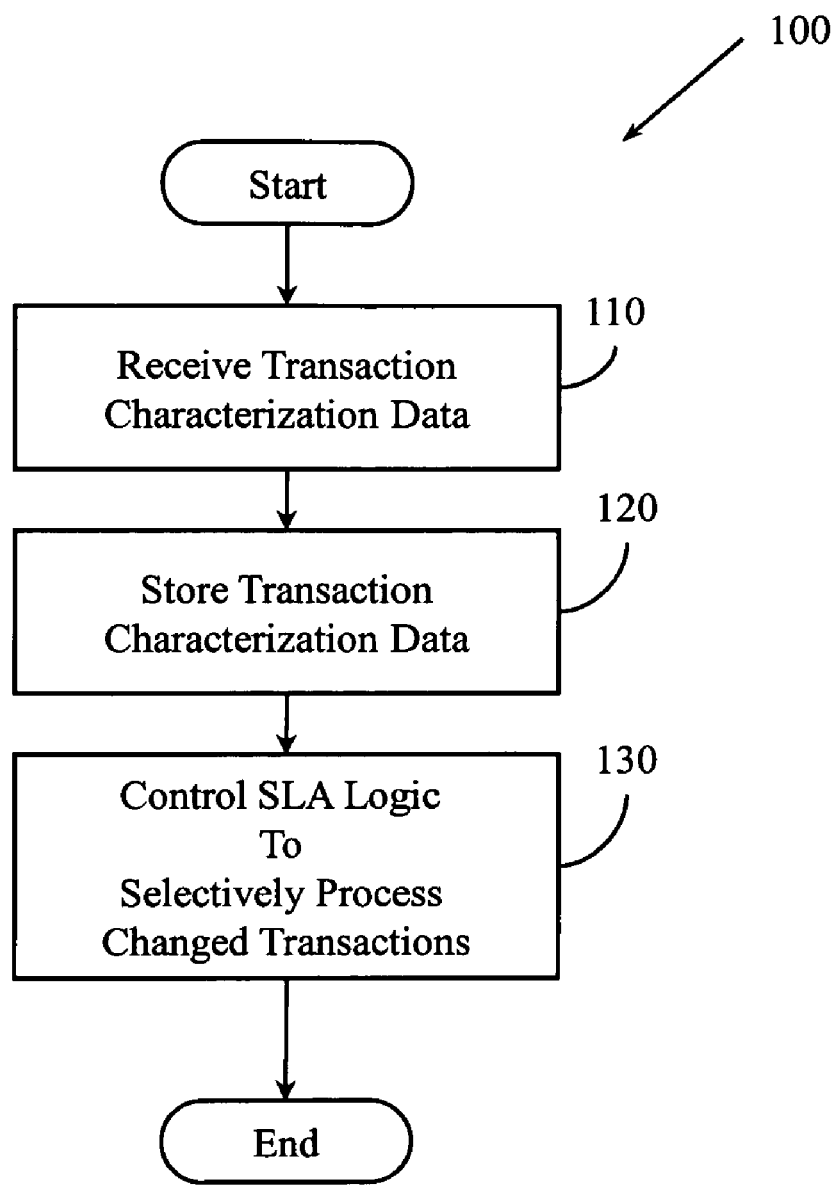
FIG. 1 illustrates an example method associated with handling ad-hoc updates to source transactions.

FIG. 1 illustrates a method 100. Method 100 registers data that facilitates handling a change to a transaction at the application level. The change may have been made after the transaction has been processed (e.g., posted) by a subsequent logic (e.g., SLA, ledger). Rather than back out the transaction and substitute it with another transaction, method 100 establishes conditions under which the change can be handled at the SLA level.

An application-level transaction may include a set of fields and a unique transaction identifier. Some fields may be identifier fields (e.g., customer number) while other fields may be amount fields (e.g., sales quantity, purchase price). Some fields may have an impact on downstream values (e.g., general ledger columns) while some fields may not. To facilitate handling a change to a transaction at the application level, even after the transaction has been processed through the SLA to the ledger, fields having an impact on downstream values may be identified at the application level and information concerning these fields may be registered with the SLA using method 100.

Method 100 includes, at 110, receiving transaction characterization data in a sub-ledger accounting (SLA) logic. The transaction characterization data may be received, for example, from a sub-ledger logic. While a single sub-ledger logic is described, it is to be appreciated that method 100 may run in an SLA logic that is connected to a plurality of sub-ledgers and/or sub-ledger logics. In one example, the transaction characterization data includes a field of interest identifier and a downstream entity impact identifier. The field of interest identifier identifies a field to which changes made at the source application level after the transaction has been processed (e.g., posted) by the SLA logic may have downstream consequences. The downstream entity impact identifier may identify downstream data items (e.g., table columns) that may be affected by the change to the field of interest. By way of illustration, a field of interest identifier may identify a sales amount field as being a field of interest. The downstream data entity impact identifier may identify a summary column (e.g., total sales) in a report (e.g., monthly sales report).

Method 100 may include, at 120, storing the transaction characterization data in a data store operably connected to the SLA logic. The data store may be, for example, a relational database table, an object, an XML document, and so on. The transaction characterization data may be stored on a per source application basis. Therefore, the transaction characterization data may be indexed. In one example, the field of interest identifier characterizes a transaction field as either an identifier field or an amount field. An identifier field may be, for example, a non-amount field that is not summarized in a downstream column. An identifier field may be, for example, a department identification number, a project identifier, a client name, and so on. An amount field may be, for example, a field that stores a value that is summarized in a downstream column. An amount field may be, for example, a sales quantity, a sales price, and so on.

Method 100 may also include, at 130, controlling the SLA logic to selectively process a transaction received from the sub-ledger logic. Whether the transaction received from the sub-ledger logic is processed differently than any other transaction may depend on whether the transaction is a changed version of a transaction previously received by the SLA logic. If the transaction is a changed version of a previously processed transaction, then the selective processing may be based, at least in part, on the transaction characterization data stored in the data store. For example, the transaction characterization data may identify fields of interest and downstream entities that are impacted by a change in a field of interest.

While FIG. 1 illustrates various actions occurring in serial, it is to be appreciated that various actions illustrated in FIG. 1 could occur substantially in parallel. By way of illustration, a first process could receive transaction characterization data, a second process could store transaction characterization data, and a third process could control an SLA logic to selectively process changed transactions. While three processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions that when executed perform method 100. While method 100 is described being stored on a computer-readable medium, it is to be appreciated that processor executable instructions to perform other example methods described herein can also be stored on a computer-readable medium.

Figure 2:
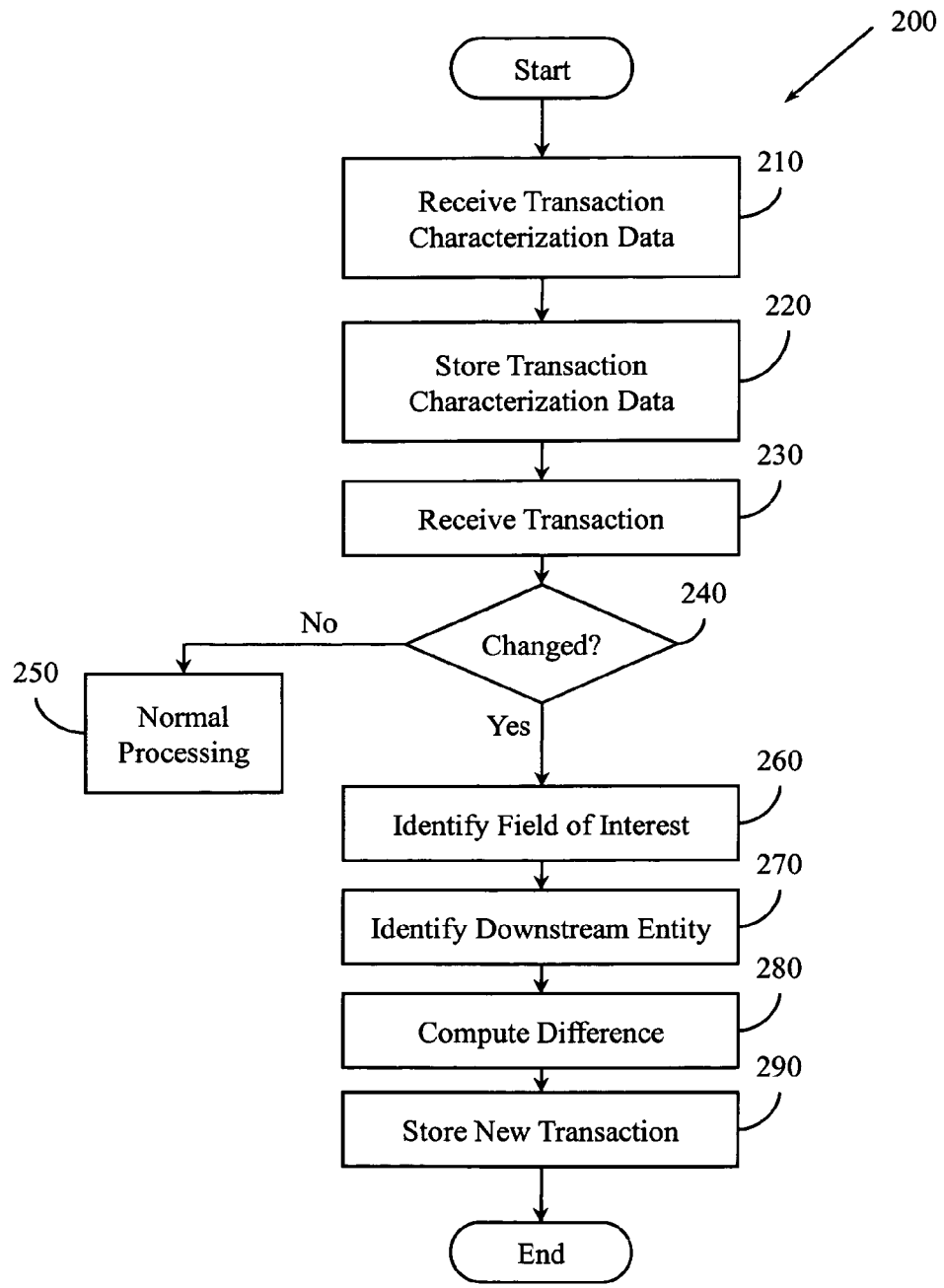
FIG. 2 illustrates another example method associated with handling ad-hoc updates to source transactions.

FIG. 2 illustrates a method 200 that includes some actions similar to those described in connection with method 100 (FIG. 1). For example, method 200 includes receiving transaction characterization data at 210 and storing transaction characterization data at 220. However, method 200 includes additional actions.

For example, method 200 includes, at 230, receiving from a sub-ledger logic a transaction having a unique transaction identifier. The transaction may be received in either a pull model or a push model. For example, an SLA logic may look in sub-ledgers for transactions that have not been posted and pull them to the SLA. Additionally, sub-ledger logics may look in related sub-ledgers and determine whether a transaction has been posted and, if not, provide (e.g., send) the transaction to the SLA. The unique transaction identifier may be used to identify whether an SLA logic has processed an earlier version of the transaction. When a transaction is changed at the source application level after it has been posted from a sub-ledger to a ledger, the unique transaction identifier is to remain the same.

Method 200 also includes, at 240, determining whether the transaction is a changed version of a transaction previously received by the SLA logic. In one example, determining at 240 that the transaction is a changed version of a transaction previously received by the SLA logic includes comparing a value in the transaction to a value stored by the SLA logic in response to receiving the transaction previously received by the SLA logic. For example, a sales amount field in the transaction may be compared to a sales amount stored by the SLA logic. If the amounts do not match, then it may be determined that the transaction has been changed. In another example, determining that the transaction is a changed version of a transaction previously received by the SLA logic includes examining a field in the transaction that includes an application level transaction change identifier. A source-level application may, for example, set a flag in a transaction to indicate that the transaction has been changed.

If the determination at 240 is that the transaction has not been changed, then normal processing may occur at 250. But if the determination at 240 is that the transaction has been changed, then method 200 may proceed with actions 260 through 290.

Method 200 may include, at 260, identifying a field of interest in the transaction. In one example, identifying a field of interest in the transaction is based, at least in part, on examining the transaction characterization data stored in the data store operably connected to the SLA logic. For example, a transaction may be received from a source level application. Which source level application provided the transaction may be known to the SLA. The SLA may therefore look through transaction characterization data registered for that source level application to determine whether this instance of a transaction from that source level application includes any fields of interest and, if so, whether there are any changes in those fields of interest.

Method 200 may also include, at 270, identifying a downstream entity impacted by the field of interest. In one example, identifying a downstream entity impacted by the field of interest includes examining the transaction characterization data stored in the data store operably connected to the SLA logic. For example, a transaction may be received from a source level application that is known to the SLA. The SLA may therefore look through transaction characterization data registered for that source level application to determine whether this instance of a transaction from that source level application includes any fields that are related to (e.g., impact) any downstream data item (e.g., general ledger column).

Method 200 may also include, at 280, computing a difference between a stored value associated with the transaction previously received by the SLA logic and a value in the changed transaction. Values in a transaction may be raw values (e.g., sales amount), derived values (e.g., sales tax), aggregate values (e.g., monthly sales total) and so on. A source level application may have allowed input of raw values and may have executed processes to produce derived and/or aggregate values. The source level application may then have populated the transaction with relevant raw values, derived values, and aggregate values. The source level application may then have marked the transaction as processed and ready for SLA synchronization. This transaction may then have been pulled into the SLA or pushed to the SLA.

Method 200 may also include, at 290, selectively storing the difference in a new SLA transaction. The SLA transaction may be stored, for example, as a row in an SLA table (e.g., central table). Making the difference available in an SLA transaction facilitates reconciling the difference between the stored value and the value in the changed transaction. Making the difference available in an SLA transaction also facilitates recording transaction correction detail in a single location (e.g., SLA) which may in turn facilitate audit trails, rollback, error recovery, and so on. In one example, storing the difference in the new SLA transaction includes adding a row to an SLA table. The SLA table may be, for example, a central SLA transaction table. The table may be stored, for example, as a relational database table. The row inserted into the table may include fields that are associated with the new SLA transaction and the changed transaction. In one example there may be a one-to-one correspondence between fields in the added row and fields in the changed transaction. In another example only selected fields may be added in the row associated with the new SLA transaction and thus there may not be a one-to-one correspondence.

While a single difference in a source level transaction is described, it is to be appreciated that a transaction may have a number of fields of interest and that a field may have an impact on a number of downstream entities. Thus, in one example, actions 280 and 290 may be repeated until the sum of amount columns across the combination of identifier columns designated equals the identifier columns and amount columns of the changed transaction.

Figure 3:
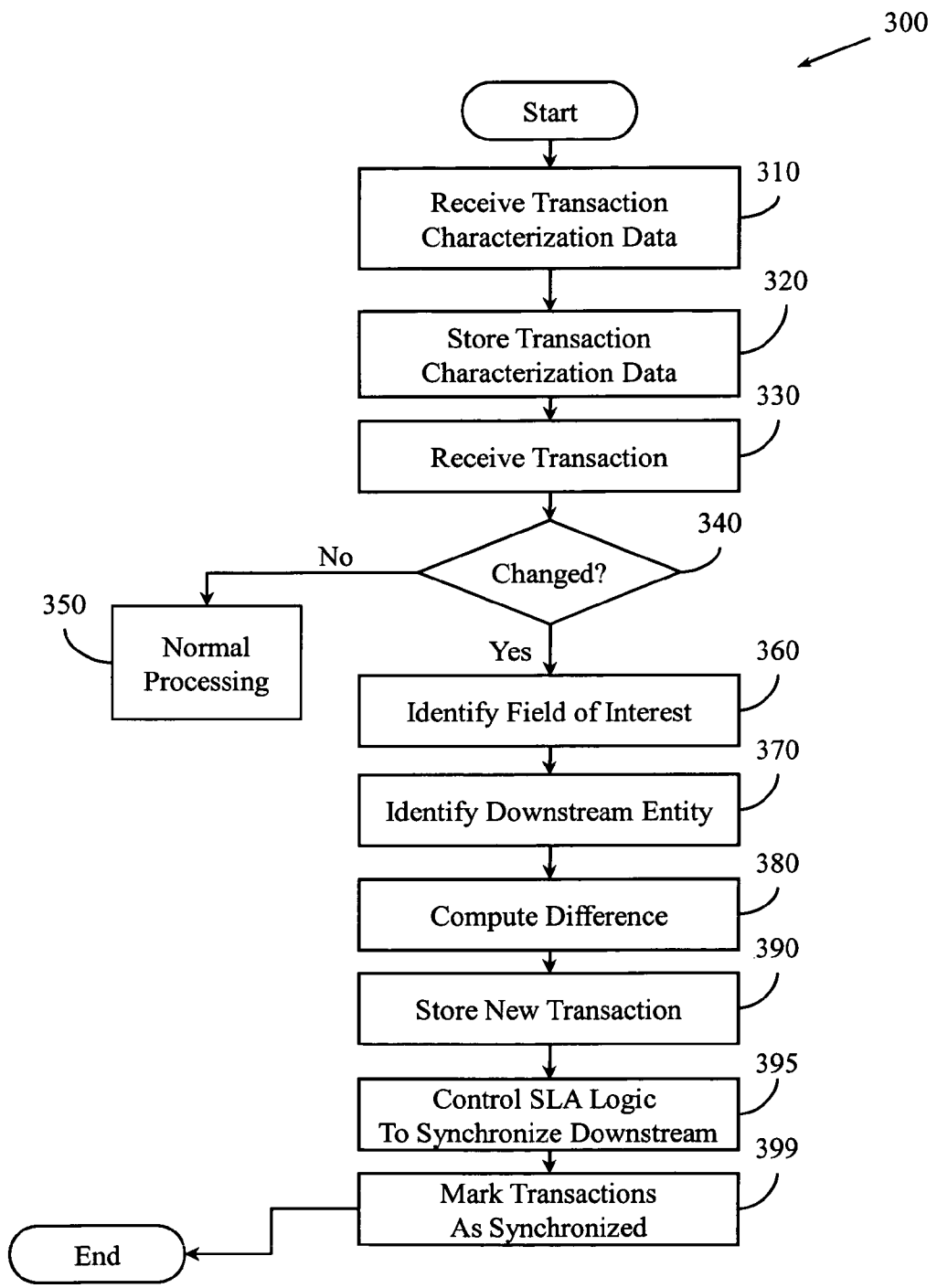
FIG. 3 illustrates another example method associated with handling ad-hoc updates to source transactions.

FIG. 3 illustrates a method 300 that includes some actions similar to those described in connection with method 200 (FIG. 2). For example, method 300 includes receiving transaction characterization data at 310 and storing transaction characterization data at 320. Method 300 also includes receiving a transaction at 330, and determining at 340 whether the transaction is a changed transaction. Method 300 also includes, either performing normal processing at 350 if the transaction is not a changed transaction, or, if the transaction is a changed transaction, identifying a field of interest at 360, identifying a downstream entity at 370, computing a difference at 380, and storing a new transaction at 390. Method 300 also includes additional actions.

For example, method 300 includes, at 395, controlling the SLA logic to synchronize the downstream entity impacted by the field of interest with the new SLA transaction. Recall that the new SLA transaction is created in response to receiving a changed transaction. The changed transaction included a field of interest that was related to a downstream entity. A change in a field of interest can produce a change in a downstream entity. For example, an updated sales quantity in the changed transaction may have downstream impact on summary columns like "monthly sales total" and so on. When the new SLA transaction is stored at 390 by the SLA logic, the values at the SLA level may be temporarily out of synchronization with the downstream entity. Thus, the SLA logic may be controlled, at 395, to perform a synchronization action. In one example, storing the new SLA transaction and controlling the SLA logic at 395 may be atomic actions.

In one example, method 300 also includes, at 399, marking transactions as synchronized. The transactions may be marked as synchronized at the SLA level upon determining that the downstream entity impacted by the field of interest has been synchronized with the new SLA transaction. Both the changed transaction and the new SLA transaction may be marked as being synchronized at the SLA logic level. Marking a transaction may include setting a value in a field in a transaction, manipulating a value in a data structure that reports information about transactions, and so on.

Figure 4:
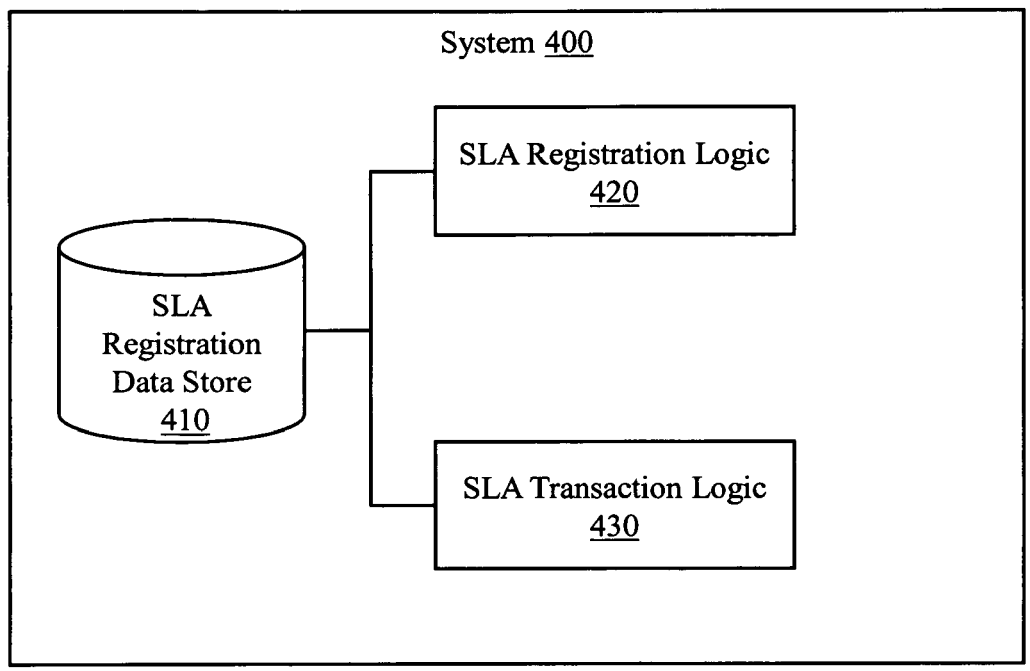
FIG. 4 illustrates an example system associated with handling ad-hoc updates to source transactions.

FIG. 4 illustrates a system 400. System 400 includes elements that facilitate handling ad-hoc updates to source transactions made at the sub-ledger level. System 400 includes an SLA registration data store 410. SLA registration data store 410 is to store characterization data associated with transactions associated with a sub-ledger. SLA registration data store 410 is also to store downstream identification data. The downstream identification data identifies a downstream data item whose value depends, at least in part, on a value in a transaction provided from the sub-ledger. In one example, the characterization data may be an XML document and/or stylesheet that describes a transaction field by field, along with providing identifiers for fields that may be changed. A field of interest may be identified using an XPath as may a downstream entity that is impacted by a change to a field of interest. In another example, the characterization data may be provided as a database record. In yet another example, the characterization data may be provided as discrete data values or tuples. One skilled in the art will appreciate that characterization data may be received and stored in different formats.

System 400 also includes an SLA registration logic 420. SLA registration logic 420 is to receive the characterization data and to store the characterization data in the SLA registration data store 410. The characterization data may be received in response to a push model action, a pull model action, and so on. For example, an application developer may design a transaction type for a source level application. The application developer may then provide (e.g., push) characterization data describing the transaction type to system 400. In another example, transaction types may be added/deleted/manipulated on the fly after applications have been developed. In this example, system 400 may periodically query source level applications to determine whether a transaction type has been added/deleted/manipulated. If so, then system 400 may pull characterization information concerning the transaction into system 400.

System 400 also includes an SLA transaction logic 430. SLA transaction logic 430 is to selectively process transactions received from the sub-ledger. SLA transaction logic 430 may determine whether a received transaction is a changed transaction, a first occurrence of a transaction, an unchanged duplicate of a transaction, and so on. The determination may be based on the characterization data stored in the SLA registration data store 410 and also on the downstream identification data stored in the SLA registration data store 410. For example, a transaction may be received by system 400. Recall that transactions are to include uniquely identifying transaction identifiers. Thus, SLA transaction logic 430 may identify a transaction as possibly being a changed transaction by noting a duplicate transaction identifier. Even though a transaction may have been previously encountered, and even though the transaction may have a changed field, it may still not be a "changed transaction" with respect to SLA transaction logic 430. For example, if the change is simply to correct a typographic error in a field that is never propagated to any downstream report, then the transaction may indeed have a changed field, but may not be a "changed transaction". However, if the change in the transaction is in a field of interest and if the field of interest is related to a downstream entity that is impacted by the change to the field of interest, then the transaction may be a "changed transaction" with respect to SLA transaction logic 430.

A transaction received by SLA transaction logic 430 may be a standalone transaction. However, a transaction received by SLA transaction logic 430 may also be the parent of child transactions. For example, a transaction may include costs that are to be distributed between three different projects. In this case, there may be three separate child transactions, one for each project, and the parent transaction. In this example, as described in greater detail below, the SLA transaction logic 430 is to produce a plurality of new SLA transactions.

Figure 5:
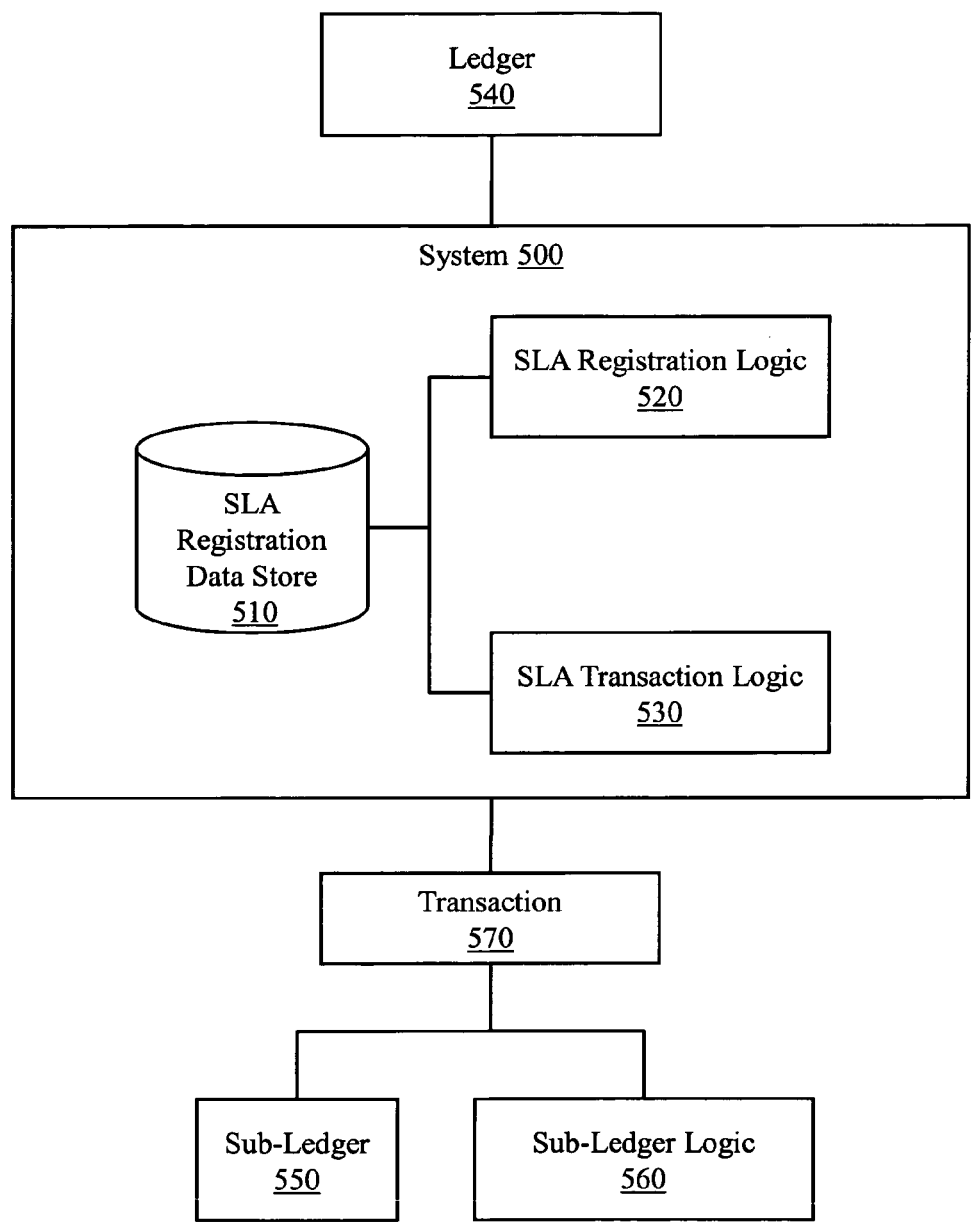
FIG. 5 illustrates another example system associated with handling ad-hoc updates to source transactions.

FIG. 5 illustrates a system 500 that includes some elements similar to those described in connection with system 400 (FIG. 4). For example, system 500 includes an SLA registration data store 510, an SLA registration logic 520, and an SLA transaction logic 530. However, the description associated with FIG. 5 further characterizes the elements and further describes the environment in which system 500 operates.

For example, the SLA transaction logic 530 is to receive a transaction 570 from a sub-ledger 550. The transaction 570 may be pulled from the sub-ledger by system 500 and/or may be pushed to the system by sub-ledger logic 560. SLA transaction logic 530 is to determine whether the transaction 570 is a changed transaction. If the transaction 570 is a changed transaction, then system 500 may need to add additional rows to an SLA data store (e.g., SLA table) and may also need to synchronize data at the SLA level with data at another level (e.g., ledger 540). Referring back briefly to FIG. 9, system 500 may, in one example, be implemented in the SLA 930.

Sub-ledger logic 560 may perform actions associated with producing a first version of a transaction 570. This first version will include a unique transaction identifier. The first version may include an error and thus may be subsequently updated. To create the first version, sub-ledger logic 560 may input and/or cause to be input direct data values for the first version. For example, sub-ledger logic 560 may present a graphical user interface to a user so that a sales quantity and per-unit price can be entered. Sub-ledger logic 560 may then calculate and/or cause to be calculated values for dependent fields. For example, if the sales quantity and sales price are known, then dependent values including discount percentage, total sales price, sales tax, and so on can be calculated. A transaction 570 may also report aggregate data. For example, the sub-ledger logic 560 may calculate and/or cause to be calculated aggregate data including total sales by salesperson, total sales by company, total sales by month, and so on. Sub-ledger logic 560 may then populate transaction 570 with the dependant and/or aggregate values. The transaction 570 is now ready to be provided to other logics (e.g., SLA transaction logic 530). Therefore, sub-ledger logic 560 may mark the transaction as "processed" and "ready for SLA synchronization". These marks may be used by push and/or pull processors to provide and/or make available the transaction 570. Once again the marks may be placed in the transaction, in a data structure that reports information about transactions, in a data store that provides information about transactions, and so on.

Sub-ledger logic 560 may also perform actions associated with producing the ad-hoc update to source transaction 570. Recall that source transaction may be stored in sub-ledger 550 and then provided and/or made available to system 500. When the sub-ledger logic 560 detects and/or causes a change to a transaction associated with sub-ledger 550, the sub-ledger logic may mark the transaction for reprocessing in the sub-ledger 550. Sub-ledger logic 560 may then re-execute logics that process the marked transaction and/or control logics to reprocess the marked transaction. After being reprocessed, the transaction may include values that differ from values stored in system 500 in response to receiving an original (e.g., unchanged) version of the transaction. Thus, the sub-ledger logic 560 may also mark the transaction for SLA synchronization and then provide to and/or make available to the system 500 the reprocessed transaction.

Figure 6:
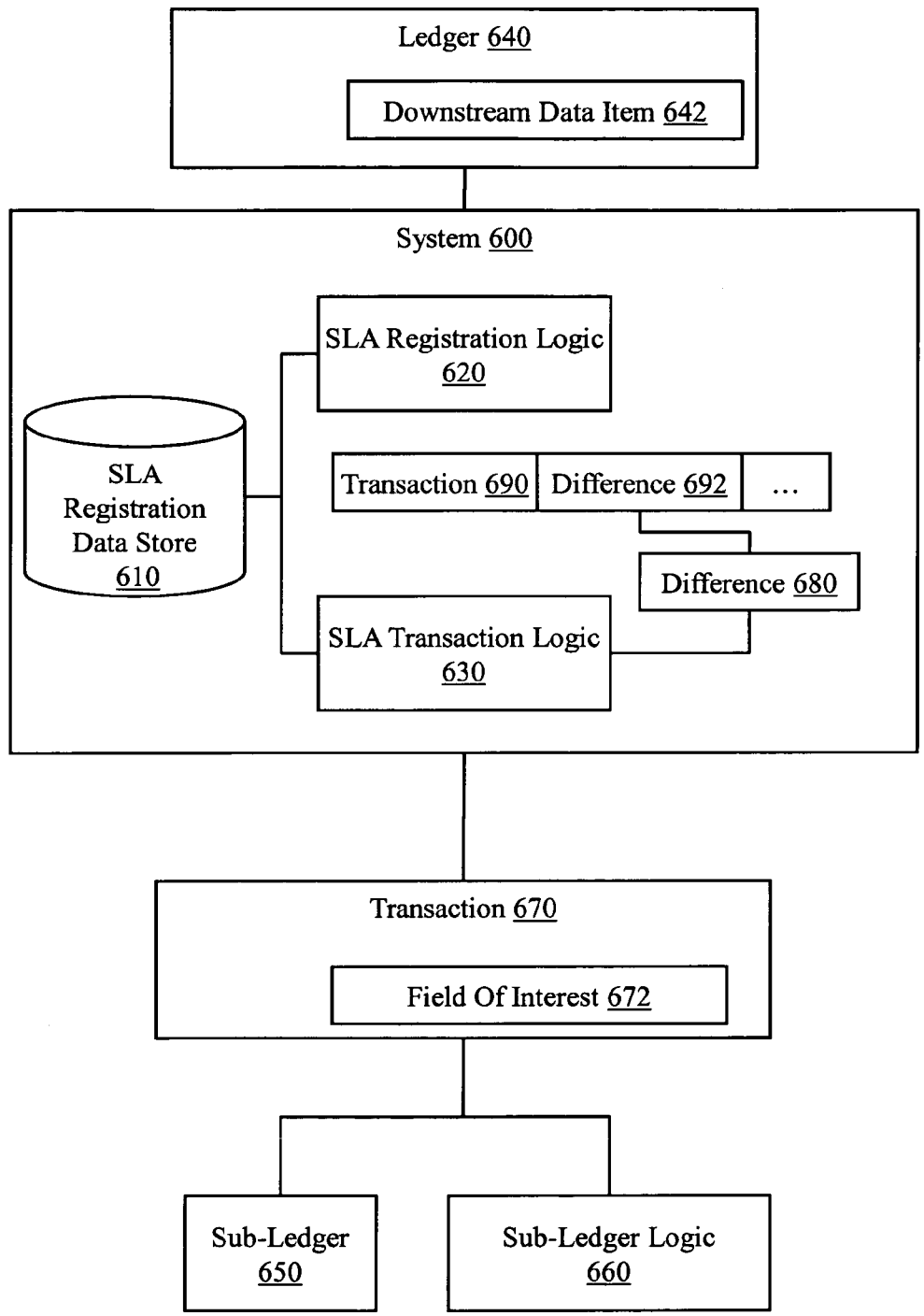
FIG. 6 illustrates another example system associated with handling ad-hoc updates to source transactions.

FIG. 6 illustrates a system 600 that includes some elements similar to those described in connection with system 500 (FIG. 5). For example, system 600 includes an SLA registration data store 610, an SLA registration logic 620, and an SLA transaction logic 630. System 600 may receive a transaction 670 associated with a sub-ledger 650 and/or sub-ledger logic 660. System 600 may also interact with downstream items like ledger 640. The description associated with FIG. 6 further characterizes the elements and further describes the environment in which system 600 operates.

For example, SLA transaction logic 630 is to determine whether transaction 670 is a changed transaction. If transaction 670 is a changed transaction, then SLA transaction logic 630 is to identify a field of interest 672 in the changed transaction 670. SLA transaction logic 630 is also to identify a downstream data item 642 whose value is impacted by a change to the field of interest 672. Having identified the field of interest 672 and the downstream data item 642, SLA transaction logic 630 acts to facilitate reconciling and accounting for the change to the field of interest 672. In one example, SLA transaction logic 630 is to compute a difference 680 between a value stored by the SLA transaction logic 630 in response to receiving a prior version of the transaction 670 and a value provided in the changed transaction 670. For example, if a prior version of transaction 670 indicated a sales quantity of 100 units sold, while the changed version of transaction 670 indicates a sales quantity of 200 units sold, then difference 680 may be computed to account for the discrepancy between 100 units sold and 200 units sold. While a single difference value is described, it is to be appreciated that in some examples transaction 670 may include a plurality of fields of interest 672 and thus SLA transaction logic 630 may produce a plurality of differences 680. Having computed the difference(s), the SLA transaction logic 630 is to store the difference 680 in a new SLA transaction 690. For example, difference 680 may be stored in difference field 692 in new SLA transaction 690. Rather than backing out a previous transaction or accepting a correction transaction from sub-ledger logic 660, system 600 computes a difference and stores a new transaction 690. Thus, transaction level change detail is stored at the SLA level by system 600. In one example, transaction 690 may be a record in a relational database table while in another example transaction 690 may be XML data stored in an XML document associated with system 600. While a relational database table and an XML document are described, one skilled in the art will appreciate that transaction 690 may have different formats and may be stored in different ways.

Figure 7:
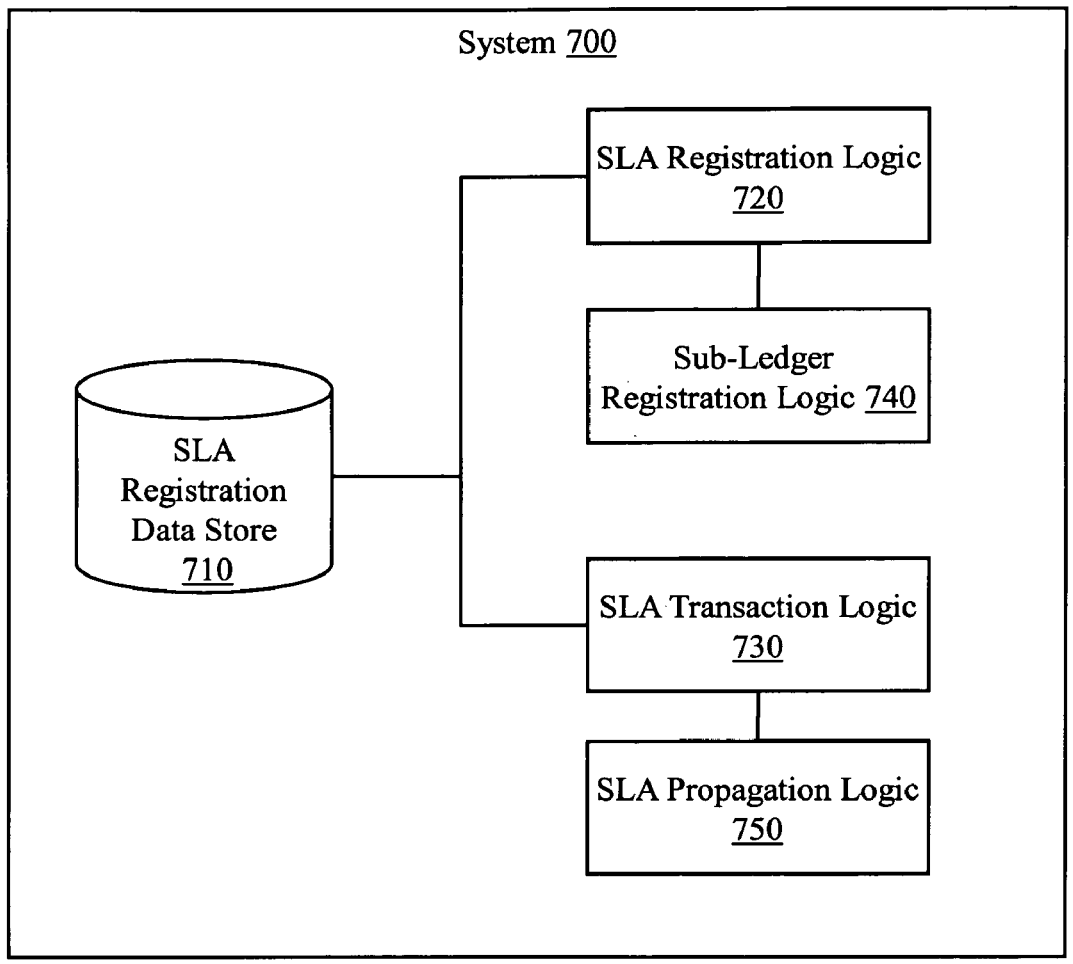
FIG. 7 illustrates another example system associated with handling ad-hoc updates to source transactions.

FIG. 7 illustrates a system 700 that includes some elements similar to those described in connection with system 600 (FIG. 6). For example, system 700 includes an SLA registration data store 710, an SLA registration logic 720, and an SLA transaction logic 730. However, system 700 includes additional elements.

For example, system 700 includes a sub-ledger registration logic 740. Sub-ledger registration logic 740 may provide characterization data that describes sub-ledger transactions. The characterization data may include, for example, field of interest identifiers, related downstream data item identifiers, and so on. In one example, characterization data may have been provided from a source level application. However, in some cases it may not be desired or possible to have a source level application provide characterization data. Thus, sub-ledger registration logic 740 may reside within system 700 rather than at the source application level.

System 700 also includes an SLA propagation logic 750. SLA propagation logic 750 is to synchronize downstream data items in light of new SLA transactions. When SLA transaction logic 730 produces a new SLA transaction, a downstream data item whose value depends on the changed field of interest may be out of synchronization with the SLA level data. Therefore SLA transaction logic 730 may propagate the change associated with the new SLA transaction out of the system 700 and into downstream entities (e.g., ledger, balance sheet, income statement). Propagating the change may include, for example, controlling a process to recalculate the downstream entity based on the current values available through system 700. Propagating the change may also include, for example, providing the new SLA transaction to a downstream consumer, informing the downstream consumer that a new SLA transaction is available and so on.

Figure 8:
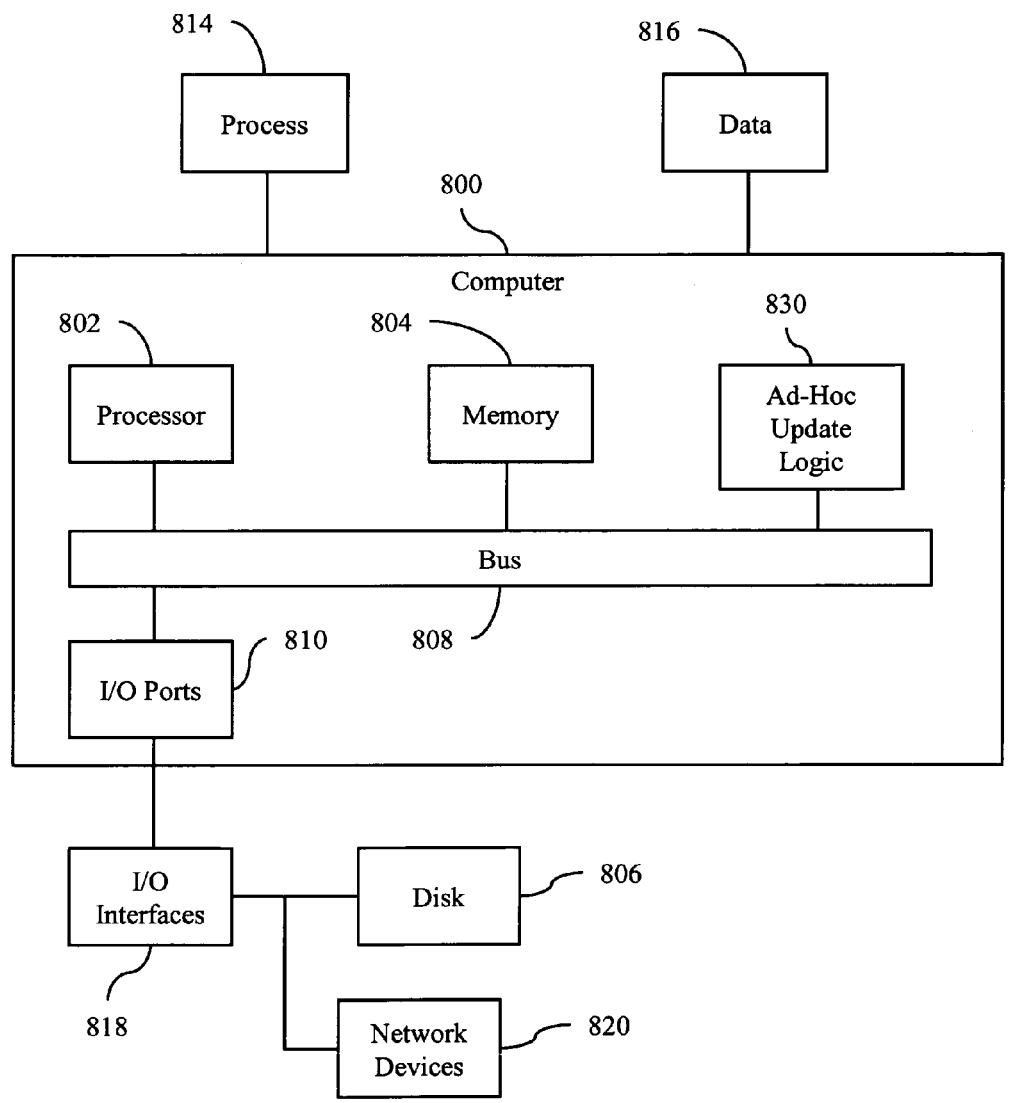
FIG. 8 illustrates an example computing environment in which example systems and methods illustrated herein can operate.

FIG. 8 illustrates an example computing device in which example systems and methods described herein, and equivalents, can operate. The example computing device may be a computer 800 that includes a processor 802, a memory 804, and input/output ports 810 operably connected by a bus 808. In one example, the computer 800 may include an ad-hoc update logic 830 to facilitate handling a change to a transaction at the application level. Ad-hoc update logic 830 may handle changes to a transaction after the transaction has been processed (e.g., posted) by a subsequent logic (e.g., SLA, ledger).

Thus, ad-hoc update logic 830 may include means (e.g., hardware, software in execution, firmware) for registering data that identifies and characterizes a field of interest in a source-level transaction. The source-level transaction may be a type of transaction that can be manipulated at the source application level after the source-level transaction is posted from a sub-ledger associated with the source application to a ledger. The ad-hoc update logic 830 may also include means (e.g., hardware, software in execution, firmware) for detecting a source-level transaction that was manipulated at the source application level after the source-level transaction was posted from the sub-ledger to a ledger. The ad-hoc update logic 830 may also include means (e.g., hardware, software in execution, firmware) for adding a row to a transaction table associated with the ledger. The row is to account for a difference between a changed source-level transaction and a previous version of the changed source-level transaction. In one example, the means for registering data may be implemented in an ASIC. In another example, the means for registering data may be implemented as instructions that are stored as data 816, brought into memory 804, and executed by processor 802. In another example, the means for registering data may be implemented as a process 814 executed by processor 802. The means for detecting and the means for adding may similarly be implemented in the different described embodiments.

Generally describing an example configuration of the computer 800, the processor 802 can be a variety of various processors including dual microprocessor and other multiprocessor architectures. The memory 804 can include volatile memory and/or non-volatile memory. The non-volatile memory can include, but is not limited to, ROM, PROM, EPROM, EEPROM, and so on. Volatile memory can include, for example, RAM, SRAM, DRAM, SDRAM, DDR SDRAM, and DRRAM.

A disk 806 may be operably connected to the computer 800 via, for example, an input/output interface (e.g., card, device) 818 and an input/output port 810. The disk 806 can include, but is not limited to, devices including a magnetic disk drive, a solid state disk drive, a floppy disk drive, a tape drive, a Zip drive, a flash memory card, and/or a memory stick. Furthermore, the disk 806 can include optical drives (e.g., a CD-ROM, a CD-R drive, a CD-RW drive, and/or a DVD ROM). The memory 804 can store processes 814 and/or data 816, for example. The disk 806 and/or memory 804 can store an operating system that controls and allocates resources of the computer 800.

The bus 808 can be a single internal bus interconnect architecture and/or other bus or mesh architectures. While a single bus is illustrated, it is to be appreciated that computer 800 may communicate with various devices, logics, and peripherals using other busses that are not illustrated (e.g., PCIE, SATA, Infiniband, 1394, USB, Ethernet). The bus 808 can be of a variety of types including, but not limited to, a memory bus or memory controller, a peripheral bus or external bus, a crossbar switch, and/or a local bus. The local bus can be of varieties including, but not limited to, an ISA bus, an MSA bus, an EISA bus, a PCI bus, a USB bus, and a SCSI bus.

The computer 800 may interact with input/output devices via i/o interfaces 818 and input/output ports 810. Input/output devices can include, but are not limited to, a keyboard, a microphone, a pointing and selection device, cameras, video cards, displays, disk 806, network devices 820, and so on. The input/output ports 810 can include but are not limited to, serial ports, parallel ports, and USB ports.

The computer 800 can operate in a network environment and thus may be connected to network devices 820 via the i/o devices 818, and/or the i/o ports 810. Through the network devices 820, the computer 800 may interact with a network.

Through the network, the computer 800 may be logically connected to remote computers. The networks with which the computer 800 may interact include, but are not limited to, a LAN, a WAN, and other networks. The network devices 820 can connect to LAN technologies including, but not limited to, FDDI, CDDI, Ethernet (IEEE 802.3), token ring (IEEE 802.5), wireless computer communication (IEEE 802.11), Bluetooth (IEEE 802.15.1), and so on. Similarly, the network devices 820 can connect to WAN technologies including, but not limited to, point to point links, circuit switching networks like ISDN, packet switching networks, and DSL.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   receiving, in a sub-ledger accounting (SLA) logic, from a sub-ledger logic, a transaction characterization data that includes a field of interest identifier and one or more downstream entity impact identifiers associated with the field of interest identified by the field of interest identifier, where a downstream entity identifier identifies an entity that is impacted by changes to values in the field of interest;
   storing the transaction characterization data in a data store operably connected to the SLA logic; and
   controlling the SLA logic to determine whether the transaction is a changed version of a transaction previously received by the SLA logic and if so, to selectively process the transaction based, at least in part, on the transaction characterization data stored in the data store.

2. The non-transitory computer-readable medium of claim 1, where the method includes:
   receiving from the sub-ledger logic a transaction having a unique transaction identifier; and
   upon determining that the transaction is a changed version of a previous version of a transaction that was previously received by the SLA logic:
      identifying a field of interest in the transaction having a value that was changed as between the previous version of the transaction and the changed version of the transaction;
      identifying a downstream entity impacted by the identified field of interest;
      computing a difference between a stored value in the identified field of interest in the previous version of the transaction and a value in the identified field of interest in the changed transaction; and
      selectively storing the difference in a new SLA transaction to reconcile the difference between the stored value and the value in the changed transaction in the identified downstream entity.

3. The non-transitory computer-readable medium of claim 2, where the method includes controlling the SLA logic to synchronize the downstream entity impacted by the field of interest with the new SLA transaction.

4. The non-transitory computer-readable medium of claim 3, where the method includes, upon determining that the downstream entity impacted by the field of interest has been synchronized with the new SLA transaction, marking the changed transaction and the new SLA transaction as being synchronized at the SLA logic level.

5. The non-transitory computer readable medium of claim 1, where the field of interest identifier characterizes a transaction field as one of, an identifier field, and an amount field, where an identifier field is a non-amount field that is not summarized in a downstream column, and where an amount field stores a value that is summarized in a downstream column.

6. The non-transitory computer-readable medium of claim 2, where determining that the transaction is a changed version of a transaction previously received by the SLA logic includes comparing a value in the transaction to a value stored by the SLA logic in response to receiving the transaction previously received by the SLA logic.

7. The non-transitory computer-readable medium of claim 2, where determining that the transaction is a changed version of a transaction previously received by the SLA logic includes examining a field in the transaction that includes an application level transaction change identifier.

8. The non-transitory computer-readable medium of claim 2, where identifying a field of interest in the transaction is based, at least in part, on examining the transaction characterization data stored in the data store operably connected to the SLA logic.

9. The non-transitory computer-readable medium of claim 8, where identifying a downstream entity impacted by the field of interest is based, at least in part, on examining the transaction characterization data stored in the data store operably connected to the SLA logic.

10. The non-transitory computer-readable medium of claim 9, where storing the difference in the new SLA transaction includes adding a row to an SLA table, where the row includes fields associated with the new SLA transaction.

11. The non-transitory computer-readable medium of claim 1,
where the field of interest identifier characterizes a transaction field as one of, an identifier field, and an amount field, where an identifier field is a non-amount field that is not summarized in a downstream column, and where an amount field stores a value that is summarized in a downstream column,
where determining that the transaction is a changed version of a transaction previously received by the SLA logic includes comparing a value in the transaction to a value stored by the SLA logic in response to receiving the transaction previously received by the SLA logic, and where the method includes:
receiving the transaction from the sub-ledger logic, where the transaction has a unique transaction identifier;
upon determining that the transaction is a changed version of a transaction previously received by the SLA logic:
identifying a field of interest in the transaction based, at least in part, on examining the transaction characterization data stored in the data store operably connected to the SLA logic;
identifying a downstream entity impacted by the field of interest based, at least in part, on examining the transaction characterization data stored in the data store operably connected to the SLA logic;
computing a difference between a stored value associated with the transaction previously received by the SLA logic and a value in the changed transaction; and
selectively storing the difference in a new SLA transaction to reconcile the difference between the stored value and the value in the changed transaction, where the new SLA transaction comprises a row in an SLA table, where the row includes fields associated with the new SLA transaction;
controlling the SLA logic to synchronize the downstream entity impacted by the field of interest with the new SLA transaction; and
upon determining that the downstream entity impacted by the field of interest has been synchronized with the new SLA transaction, marking the changed transaction and the new SLA transaction as being synchronized at the SLA logic level.

12. A system, comprising:
an SLA registration data store configured to store characterization data associated with transactions associated with a sub-ledger, where the characterization data comprises downstream identification data that identifies a downstream data item whose value depends, at least in part, on a value in a transaction;
an SLA registration logic configured to receive the characterization data and to store the characterization data in the SLA registration data store; and
an SLA transaction logic configured to selectively process transactions received from the sub-ledger by:
determining whether a second transaction is a changed version of a first transaction;
if the second transaction is a changed version of the first transaction, accessing the characterization data stored in the data store to identify a downstream data item affected by the change between the first transaction and the second transaction; and
reconciling the downstream data item to reflect the second transaction.

13. The system of claim 12, where the SLA transaction logic, upon determining that the transaction is a changed transaction, is configured to compute a difference between a value stored by the SLA transaction logic in response to receiving the first transaction and a value provided in the second transaction, and to use the difference to reconcile the data item.

14. The system of claim 13, where the SLA transaction logic is configured to store the difference in a new SLA transaction that reconciles the data item.

15. The system of claim 12, where the SLA transaction logic is configured to produce a plurality of new SLA transactions in response to receiving a changed transaction associated with a plurality of child transactions.

16. The system of claim 12, where the characterization data is stored in one of, a relational database table, and an XML document.

17. A non-transitory computer-readable medium storing computer-executable instructions that when executed by a computer cause the computer to perform a method, the method comprising:
storing transaction characterization data for transactions processed by an accounting system; where the transaction characterization data comprises a list of fields of interest that are changeable by a user and identifies fields of interest having values, that when changed, affect values of one or more downstream entities;
storing a first SLA transaction corresponding to a source transaction;
receiving a revision transaction corresponding to a changed version of the source transaction having different values in one or more fields of interest; and
creating a second SLA transaction, that when combined with the first SLA transaction, will reconcile values of the fields of interest that affect downstream entities with values of the corresponding fields of interest in the revision transaction.

18. The non-transitory computer-readable medium of claim 17 where storing the transaction characterization data comprises storing metadata that designates a field of interest as a matching column or a summary column, where summary columns designate a value, that when changed, affects a downstream entity.

19. The non-transitory computer-readable medium of claim 18 where creating a second SLA transaction comprises generating a row in an SLA table that includes the fields of interest specified by the transaction characterization data, where fields of interest that are designated matching columns are populated with values in a corresponding column of the second SLA transaction and fields of interest that are designated summary columns are populated with a difference in values between the first SLA transaction and the revision transaction.

* * * * *

UNITED STATES PATENT AND TRADEMARK OFFICE
CERTIFICATE OF CORRECTION

PATENT NO. : 8,290,834 B2  Page 1 of 1
APPLICATION NO. : 12/150167
DATED : October 16, 2012
INVENTOR(S) : Mundy It is certified that error appears in the above-identified patent and that said Letters Patent is hereby corrected as shown below:

In column 16, line 36, in Claim 5, delete "computer readable" and insert -- computer-readable --, therefor.

Signed and Sealed this
Eighth Day of January, 2013

David J. Kappos
*Director of the United States Patent and Trademark Office*